US005535652A

United States Patent [19]

Beck et al.

[11] Patent Number: 5,535,652

[45] Date of Patent: Jul. 16, 1996

[54] LATHE APPARATUS

[76] Inventors: Gerald S. Beck, P.O. Box 843, Wahpeton, N. Dak. 58074; Howard G. Ravenstein, 367 N. 14th St., Wahpeton, N. Dak. 58075

[21] Appl. No.: 327,032

[22] Filed: Oct. 21, 1994

[51] Int. Cl.[6] .............................. B23B 9/10; B23B 25/06; B23B 19/00; B27C 7/00

[52] U.S. Cl. .............................. 82/118; 82/129; 82/142; 82/148; 142/4; 142/40; 142/47; 142/55; 409/166

[58] Field of Search .............................. 142/4, 7, 40, 47, 142/1, 5, 17, 9, 10, 11, 13, 26; 82/131, 148, 117, 118, 129, 142; 409/165, 166

[56] References Cited

U.S. PATENT DOCUMENTS

| | | | |
|---|---|---|---|
| 2,208,572 | 7/1940 | Drummond | 409/165 |
| 3,830,268 | 8/1974 | Ellison | 142/4 |
| 4,372,355 | 2/1983 | Force, Jr. et al. | 142/4 |
| 4,527,602 | 7/1985 | Martin | 142/7 |
| 4,611,644 | 9/1986 | Larson | 142/7 |
| 4,813,311 | 3/1989 | Hebbruggen | 82/117 |
| 4,936,174 | 6/1990 | Holy et al. | 82/142 |

*Primary Examiner*—Steven C. Bishop
*Attorney, Agent, or Firm*—Robert E. Kleve

[57] ABSTRACT

The invention comprises an automatic lathe apparatus adapted to be programmed for automatically cutting work pieces into contours with a pair of radial saw blades. The apparatus has an elongated frame with a center drive mechanism movably mounted on the frame intermediate the ends of the frame to accommodate variable length work pieces. The center drive mechanism provides opposing drive spindles independently driven to engage a pair of work pieces at one of their ends and drive them thereby. A pair of tail stock spindles are movably mounted and adjustable at the ends of the frame and have air operated cylinders to drive the spindles into engagement with the other ends of the work pieces. A screw operated platform is power driven by a screw to drive longitudinally along the length of the frame. A screw operated lateral platform is operated by a screw to move laterally toward and away from the frame and carries a pair of air cylinder operated platforms thereon with a power operated radial saw on one of the pair of another cutting tool on the other of the pair of platforms, whereby the one of the air operated cylinders may be selectively operated to move the radial saw or other cutting tool into use for cutting and the laterally operated platform and longitudinally operated platform may be operated by a computer program to move the radial saw or cutting tool toward and away and along the work pieces to cut and contour the work pieces.

3 Claims, 2 Drawing Sheets

LATHE APPARATUS

This invention relates to lathes, more particularly, the invention relates to lathes having an automatic mechanism for automatically adjusting a radial saw in relation to wooden work pieces and the like for contouring the wooden work pieces to a selected contour.

It is an object of the invention to provide a novel lathe having an automatic mechanism for programming various contours for movement of a radial saw along a work piece and cut to form a contour in the work piece.

It is a further object of the invention to provide a novel automatic lathe having a radial saw with means to adjustably position the saw along the length and width of the lathe and a work piece in the lathe for contouring the work piece in accordance with the programing.

It is a further object of the invention to provide a novel lathe having a dual set of spindle mountings with a radial saw blade mounted on a mechanism for movement along the lathe and spindles to engage and contour a plurality of work pieces in an automatic sequence.

Further objects and advantages of the invention will become apparent as the description proceeds and when taken in conjunction with the accompanying drawings wherein:

BRIEF DESCRIPTION OF THE PREFERRED EMBODIMENT

Briefly stated, the invention comprises an automatic dual work piece radial saw contouring lathe for sequentially contouring a dual set of work pieces in accordance with a program. The lathe has a frame with movable spindle supports at the ends of the frame for supporting a pair of work pieces at their outer end and a movable center drive mechanism intermediate the ends of the frame for individually rotating the work pieces at their inner ends on opposite sides of the drive mechanism. A platform is screw operated to move along the length of the lathe along both work pieces and carries a screw operated platform to move toward and away from the work pieces. A pair of air cylinder operated platforms are mounted on the lateral platform and each carries a power driven radial saw or other cutting tool whereby the air cylinder operated platforms may be selectively operated to move a radial saw or other selected cutting tool into operative use and the screw operated platforms may move the selected radial saw or other cutting tool along and toward and away from the work pieces in accordance with a program to automatically cut and contour the the work pieces into a shape in accordance with the program.

Figure 1:
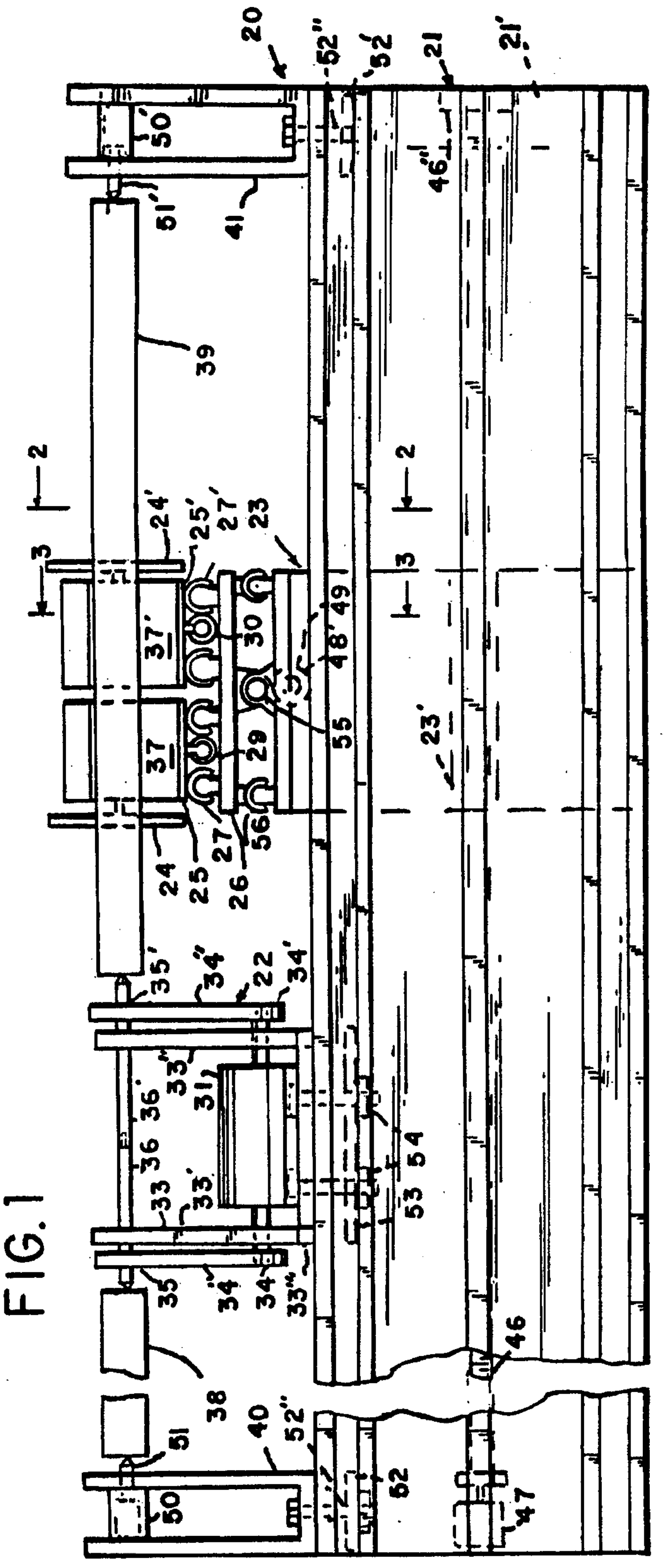
FIG. 1 is a side elevational view of the automatic lathe for contouring a dual set of work pieces.
Figure 2:
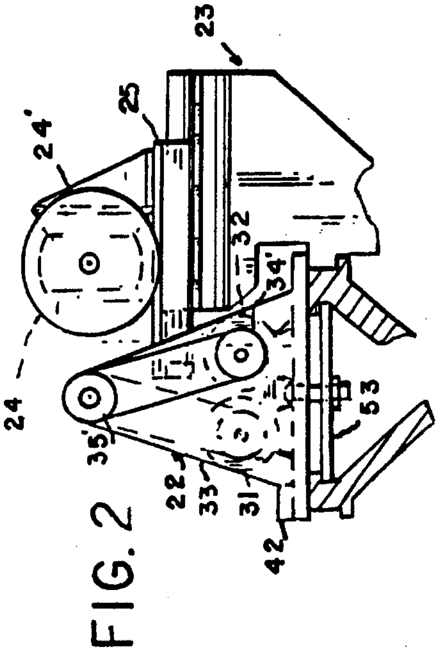
FIG. 2 is an enlarged fragmentary end view of the the automatic lathe for contouring a dual set of wooden work pieces automatically, taken along line 2—2 of FIG. 1.
Figures 4, 5, 6, 7, 8:
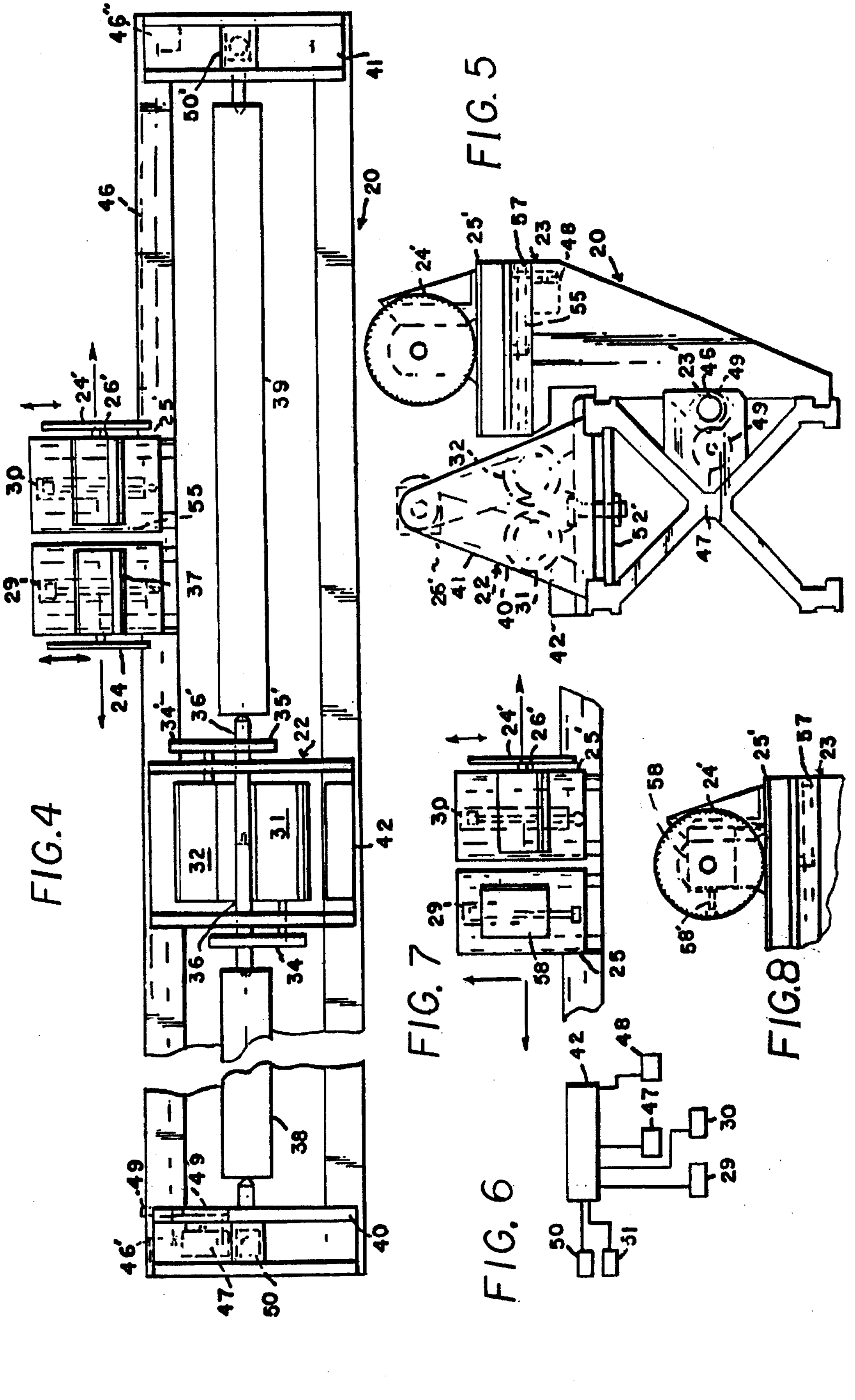
FIG. 4 is a top plan view of the automatic radial saw dual work piece contouring lathe.
FIG. 5 is an end view of the automatic radial saw contour lathe.
FIG. 6 is a schematic electric diagram of the lathe invention.
FIG. 7 is a fragmentary view of a modified router for cutting.
FIG. 8 is a side view of the modified router attachment.

Referring more particularly to the drawings, In FIG. 1, the automatic dual spindle radial saw contouring lathe 20 is illustrated having a main frame 21 with a uniform generally x shaped cross sectional shape as illustrated in FIG. 5, formed by two opposing V shaped parts 21' and 21". A center lathe drive mechanism 22 has a U frame 33 mounted on the center of the frame 21 of the lathe 20. A longitudinal movable saw platform 23 is movable along the length of the frame. A pair of radial saws 24 and 24' are mounted on platforms 25 and 25' and the platforms 25 and 25' are slidably mounted on platform 26 on guideways 27 and 27' and platform 26 is slidably mounted laterally on platform 23 on guideways 28 and 28'. The platforms 25 and 25' have a pair of air cylinders 29 and 30, respectively, with their cylinder portions 29" and 30" fixed to platform 26 and their pistons 29' and 30' fixed to the platforms 25 and 25', respectively. The saws 24 and 24' are conventional radial blade saws. The laterally movable platform 26 is power driven by a screw 55.

The center lathe mechanism 22 has a pair of motors 31 and 32, which are mounted on the base 33'" of the U frame 33, with their shafts 31' and 32' extending freely through bores in the upright frame plate members 33' and 33" of the U frame 33. A pair of pulleys 34 and 34' are fixed to the shafts 31' and 32', respectively. A pair of pulley belts 34" are mounted with their lower ends over pulleys 34 and 34' and their upper ends over pulleys 35 and 35'. The pulleys 35 and 35' are fixed to the outer ends of shafts 36 and 36'. The shafts 36 and 36' are mounted coaxially of one another in the upright frame members, with their inner ends interconnecting in a pin and sleeve connection to support each other but enable each shaft 36 and 36' to rotate independently of one another.

The radial saws 24 and 24' are mounted to the output shafts of motors 37 and 37' and motors 37 and 37' are mounted on the platforms 25 and 25' respectively.

The shafts 36 and 36' have centering and drive spindles at their outer opposing ends to engage the ends 38' and 39' of the wooden work pieces 38 and 39 to rotate the wooden work pieces for engagement with the radial saws for contouring the wooden work pieces.

A plate 53 is mounted beneath the U shaped frame of the drive mechanism 22 and has a pair of bolts 54, which extend through the base 33'" of the U frame and through the plate 53 and nuts 54'", are threaded onto the bolts to lock the U frame of the drive mechanism in a selected location along the length of the frame 21. The bolts 54 may be loosened to slide the U frame 33 along the lathe frame 21 to a different selected location and then the bolts can be retightened to lock the U frame 33 in that position.

The lathe 20 has a pair of U shaped tail stock frames 40 and 41 which are adjustably mounted at each end of the lathe frame 21. The tail stock U shaped frames 40 and 41 are each constructed to be adjustably positioned along the length of the lathe frame 21 and locked at their adjusted positon to adjust the length between the head stock and tail stock on each side of the work pieces 38 and 39 to hold the work pieces on each side of the lathe. A plate 52 and 52' are mounted beneath the U shaped frame 40 and 41 and the plates 52 and 52' are engaged against the underside of the lathe frame, with bolts 52" and 52" extending through the U frames 40 and 41 and through the plate 52 and 52', respectively, with nuts threaded onto the bolts to lock the U shaped frames of the tail stocks at their location on the lathe frame.

Each platform 25 and 25' have a pair of sleeves fixed thereto which are slidably mounted to rods fixed to the platform 26 to provide the guideways 27 and 27' for each of the platforms 25 and 25'.

Each U shaped frame 40 and 41 has an air cylinder 50 and 50' mounted across the top of the U shaped frame, across the upper ends of the frame. Each cylinder has a piston 51 and 51', with their outer ends tapering to a point and serving as centering spindles for engagement with the other ends 38" and 39" of the work pieces. Air under pressure is introduced into the cylinder to project the pointed ends of the pistons against the ends of the work pieces, with the amount of pressure being regulated in a conventional manner to provide a constant pressure sufficient to enable the pistons to serve as centers, but not so strong as to fracture the works pieces, which are customarily of wood.

A conventional computer programmed instrument panel 42 is mounted to the lathe frame 21 and is electrically connected to the motor 47 for powering the platform 23 along the lathe frame 21, parallel to the rotational axis of the work pieces. The instrument panel 42 is also electrically connected to air pumps, not shown, for providing air pressure to the cylinders 29 and 30, and 50 and 50' for operating the cylinders, and is also electrically connected to motors 31 and 32 for powering the center drive, motors 37 and 37' for powering the radial saws 24 and 24, and motor 48 for powering the screw 55 for moving the lateral platform 26.

The platform 23 is power driven along the length of the lathe frame 21 by a screw 46 which extends along the length of the frame, with the ends of the screw rotatably mounted in bearing s 46' and 46" at each end of the lathe. The platform 23 has a threaded sleeve 23' fixed thereto, which the sleeve 23' is threaded into. A motor 47 is mounted at one end of the lathe frame with a gear 49 fixed to its output shaft which drives a gear fixed axially to the screw 46 whereby powering the motor 47 rotates the screw to move the platform 23 in one direction along the length of the lathe frame, and powering the motor 47 in the opposite direction drives the platform 23 in the opposite direction along the lathe frame.

Operation

The automated lathe invention has a conventional computer control panel 42 which can be programmed to a selected contour in a conventional manner, and further programmed to a selected radial blade 24 or 24'. It is contemplated that the second radial saw blade will have a different cutting edge than the first saw blade 24 or the second cutting tool 24' may be a routing tool or some other type of cutting tool. The control panel will activate the selected air cylinder 29 or 30 in accordance with the selected contour program to place either radial saw blade 24 controlled by air cylinder 29 or place the other cutting tool 24' inward to an operative position for use in cutting the programmed contour. Thereafter, the computer in accordance with the selected programmed contour will move the radial saw blade 24, for example, assumming it is the selected cutting tool, along the lathe frame by screw 46 moving platform 23 and move the selected cutting blade inward and outward to and from the lathe frame by screw 55 while the radial saw blade 24 cuts into the work pieces sequentially one work piece after the other to contour the work pieces in accordance with the selected program.

Figure 3:
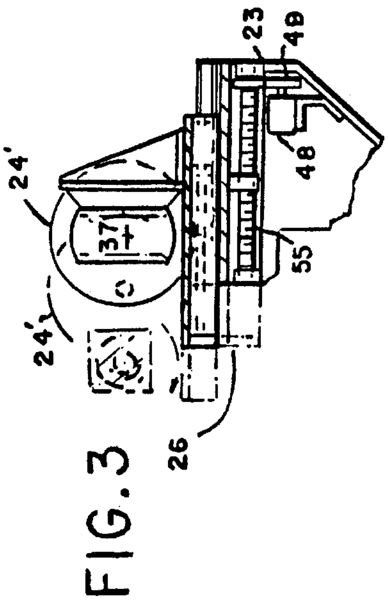
FIG. 3 is a cross sectional view taken along line 3—3 of FIG. 1.

The motors 31 and 32 of the center drive mechanism 22 will rotate the work pieces 38 and 39 clockwise, through their drive spindles 36 and 36' when viewed from FIGS. 3 and 5. The motors 37 and 37' will rotate the radial saw blade 24 or cutting tool 24' counter clckwise, when viewed from FIG. 3 and 5. The work pieces being contoured by the radial saw 24 will be cut by the radial saw at a relatively high rate of speed to thereby contour the work pieces relatively fast. It is contemplated that the directional rotation of the saw or cutting tool in relation to the rotation of the work pieces may be varied under some circumstances.

The rotation of the work pieces will be about 360 degrees while the radial saw rotates and cuts into the work pieces.

The computer can be programmed to move the platform 23 along the frame to work piece 38 and position either radial saw 24 or 24' by activation of cylinder 29 or 30, activate the motor to power the selected saw, and then move the platform along work piece 38 with the radial saw 24, for example, rotating and cutting into the work piece while the the motor 48 moves platform 26 in and out toward and away from the work piece on screw 55 to vary the contour being cut into the work piece in accordance with the program. Thereafter the computer can be programmed to perform the same cutting operation on work piece 39, by initially moving the platform 23 to work piece 39.

Thus, the lathe apparatus enables two work pieces to be cut and contoured automatically, one after another, before the work pieces need to be replaced for another contouring.

The center drive mechanism 22 has enough clearance from the platform 23 and its guideways and the sliding platforms 25, 25', the radial saws 24 and 24' and platform 26 and etc. that the screw 46 can power the platform 23 along the lathe frame behind the drive mechanism 22 from one work piece to the other with the platform 23 and its components easily clearing the drive mechanism and its components.

The adjustable mounting of the center drive mechanism 22 on the lathe frame 21, by the U frame 33 and its connection with the plate 53 by the bolts 54' enables the U frame 33 to be slid along the lathe frame 21 toward one end of the lathe frame to accomodate a work piece more than half the length of the late frame, and then locking the U frame in its adjusted position by tightening the bolts 54' and their nuts. The center drive mechanism may be adjusted toward one end of the frame far enough to accomodate for cutting and contouring a single work piece nearly the entire length of the lathe frame.

The platform 23 has spaced roller bearings 56 and 56' mounted along its opposite upper ends and similarly spaced roller bearings 57 and 67' mounted adjacent its opposite lower ends which roll along the upper and lower channels in the lathe frame, along the length of the lathe frame to provide a rolling support for the platform 23 on the lathe frame 21, as the platform is powered along the length of the frame 21 by the screw 46.

The radial blade 24 may be a thicker blade relative to the blade 24' to provide a rough cut of the contour on the work piece, while the radial saw blade 24' may be thinner with finer teeth to provide a finishing cut to the work piece.

As an alternative form of construction or operation, the radial saw 24 may be replaced on the platform 25 with a motorized router 58 and the router may be used to provide routing cuts to the work pieces together with the radial saw 24', as shown in FIGS. 7 and 8.

Thus, it will be seen that a novel high speed wood contouring lathe has been provided for cutting wooden pieces, such as bannisters, columns, and posts, which has a pair of radial saws which can be selectively used, or a pair of cutting tools such as a radial saw and a router which can be selectively used on precision operated screw platforms that move laterally and longitudinally relative to the lathe frame to cut and contour a pair of work pieces automatically and rapidly in accordance with conventional programmable computer arrangments.

It will be obvious that various changes and departures may be made to the invention without departing from the spirit and scope thereof, and accordingly, it is not intended that the invention be limited to that specifically described in the specification or as illustrated in the drawings, but only as set forth in the appended claims wherein:

What is claimed is:

1. In an automatic lathe apparatus having computer programming for its operation, the combination comprising an elongated lathe frame, a center drive mechanism positioned adjacent the center of the lathe frame; a pair of adjustable tail stocks at each remote end of the length of the frame; said center drive mechanism having opposing power driven head stock spindles extending outward toward the tail stocks, said adjustable tail stocks being adjustable toward and away from the center drive mechanism to enable work pieces to be mounted one on each side of the center drive mechanism between the center drive mechanism and each tail stock and be rotatably driven by rotation of the head stock spindles; a power driven first screw actuated platform movable by screw actuation longitudinally along the length of the frame and past the center drive mechanism from adjacent one tail stock to adjacent the other tail stock, a second power driven screw actuated platform movable horizontally on said first platform by screw actuation laterally of length of the frame toward the work pieces thereon, said second screw actuated platform having laterally adjustable means thereon, a radial saw mounted on said laterally adjustable means of said second screw actuated platform and power actuated, whereby said power means of said first and second screw actuated platforms, said head stock spindles, and said radial saw may be programmed by said computer program to move said said radial saw under said first screw platform along the work piece to cut axially along the work piece and move laterally inward on said second screw actuated platform to cut laterally into said work piece while said power driven spindles are power driven to rotate the work piece to cut the work piece in a contour in accordance with said program.

2. In a automatic lathe apparatus having a computer program for its operation, the combination comprising an elongated lathe frame, a center drive mechanism adjustably positioned adjacent the center of the late frame; a pair of adjustable tail stocks at each remote end of the length of the frame; said center drive mechanism and tail stocks being adjustable longitudinally along the length of the frame, to enable work pieces to be mounted one on each side of the center drive mechanism between the spindles on the drive mechanism and each tail stock and be rotatably driven by rotation of the head stocks; a power driven first screw actuated platform movable by screw actuation longitudinally along the length of the lathe frame past the center drive mechanism from adjacent one tail stock to adjacent the other tail stock, a second power driven screw actuated platform movable by screw action on said first screw actuated platform laterally and horizontally of the frame toward the pieces, said second screw actuated platform having power actuated laterally horizontal adjustable means, a radial power driven rotatable saw on said laterally adjustable means, whereby said power of said first and second screw actuated platforms, said head stock spindles, said laterally adjustable means, and said radial saw may be programmed by said computer program to move longitudinally along one of said work pieces for said radial saw to cut longitudinally along the work piece with said first platform and move laterally inward on said second platform to cut laterally into said one work piece while said power driven spindles rotate the work piece to cut the work piece in a contour in accordance with the program and thereafter move laterally outward on said laterally adjustable means and longitudinally along the frame past the mechanism to the other of said work pieces and move laterally inward on said laterally adjustable means and repeat the lateral and longitudinal cutting on said other work piece to cut the other work piece in a contour in accordance with said program.

3. In an automatic lathe apparatus having a computer program for its operation, the combination comprising an elongated frame, a drive mechanism having a power driven head sock spindle, an adjustable tail stock at a remote end of the length of the frame to enable a work piece to be mounted between the head stock spindle and the tail stock and be rotatably driven by the head stock spindle, a power driven first screw actuated platform movable by screw actuation longitudinally along the length of the frame, a second power driven screw actuatable platform movable horizontally on said first platform by screw actuation laterally of the length of the frame toward the work piece mounted thereon, said second screw actuated platform having horizontal laterally adjustable means thereon, a power driven rotatabe radial saw mounted on said lateral adjustment means of said second screw actuated platform, whereby said first and second screw actuated platforms, said head stock spindles, and said radial saw may be power driven to move said radial saw while in cutting rotation on sad first screw actuated platform to cut along the longitudinal length of the work piece and move laterally and horizontally inward of the frame into the work piece on the second screw actuated platform to cut laterally into the work piece while the power driven spindle rotates the work piece to cut the work piece into a contour in accordance with said program.

* * * * *